United States Patent
Tu et al.

(10) Patent No.: US 10,877,885 B2
(45) Date of Patent: Dec. 29, 2020

(54) ELECTRONIC DEVICE DATA OPERATION METHOD AND ELECTRONIC DEVICE FOR IMPROVED ELECTRONIC DEVICE STORAGE

(71) Applicant: HUAWEI TECHNOLOGIES CO., LTD., Shenzhen (CN)

(72) Inventors: Yongfeng Tu, Shenzhen (CN); Wenmei Gao, Beijing (CN); Yuanli Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 6 days.

(21) Appl. No.: 16/314,420

(22) PCT Filed: Jun. 30, 2016

(86) PCT No.: PCT/CN2016/087842
§ 371 (c)(1),
(2) Date: Dec. 30, 2018

(87) PCT Pub. No.: WO2018/000300
PCT Pub. Date: Jan. 4, 2018

(65) Prior Publication Data
US 2019/0227930 A1    Jul. 25, 2019

(51) Int. Cl.
*G06F 12/0804* (2016.01)
*G06F 12/08* (2016.01)
*G06F 3/06* (2006.01)

(52) U.S. Cl.
CPC ........ *G06F 12/0804* (2013.01); *G06F 3/0605* (2013.01); *G06F 3/0622* (2013.01);
(Continued)

(58) Field of Classification Search
CPC .... G06F 12/0804; G06F 12/08; G06F 3/0605; G06F 3/0622; G06F 3/0643;
(Continued)

(56) References Cited

U.S. PATENT DOCUMENTS

2003/0135688 A1    7/2003  Tai et al.
2003/0191911 A1*  10/2003  Kleinschnitz, Jr. ....... G06F 8/63
                                                              711/154
(Continued)

FOREIGN PATENT DOCUMENTS

CN    101938523 A    1/2011
CN    102169459 A    8/2011
(Continued)

*Primary Examiner* — Tasnima Matin
(74) *Attorney, Agent, or Firm* — Kilpatrick Townsend & Stockton LLP

(57) ABSTRACT

A method is applied to an electronic device, all storage space of the electronic device includes internal storage space and at least one external storage space, and the method includes: receiving a data write instruction, where the data write instruction carries target write data; selecting at least one of all the storage space as target storage space according to a preset rule, and performing a write operation in the target storage space; and after the write operation is completed, updating a virtual file that is obtained by summarizing and combining files of a same file type in all the storage space of the electronic device and that is stored in a virtual storage card, and updating a mapping relationship between a virtual storage path corresponding to the virtual storage card and a physical storage path corresponding to the target storage space.

20 Claims, 9 Drawing Sheets

(52) U.S. Cl.
CPC .......... *G06F 3/0643* (2013.01); *G06F 3/0653* (2013.01); *G06F 3/0667* (2013.01); *G06F 3/0683* (2013.01); *G06F 12/08* (2013.01)

(58) Field of Classification Search
CPC .... G06F 3/0653; G06F 3/0667; G06F 3/0683; G06F 3/0685; G06F 21/79
See application file for complete search history.

(56) References Cited

U.S. PATENT DOCUMENTS

| | | | | |
|---|---|---|---|---|
| 2009/0265384 | A1* | 10/2009 | Xu | G06F 16/40 |
| 2012/0182939 | A1* | 7/2012 | Rajan | A61B 5/0022 |
| | | | | 370/328 |
| 2013/0009967 | A1 | 1/2013 | Nanaumi | |
| 2014/0068015 | A1* | 3/2014 | Shin | H04L 67/02 |
| | | | | 709/219 |
| 2014/0071753 | A1* | 3/2014 | Shin | G06F 12/0868 |
| | | | | 365/185.03 |
| 2014/0115609 | A1* | 4/2014 | Chen | G06F 8/60 |
| | | | | 719/328 |
| 2016/0054928 | A1* | 2/2016 | Chun | G06F 12/10 |
| | | | | 711/2 |

FOREIGN PATENT DOCUMENTS

| | | |
|---|---|---|
| CN | 102622189 A | 6/2012 |
| CN | 102646042 A | 8/2012 |
| CN | 103019534 A | 4/2013 |
| CN | 103425436 A | 12/2013 |
| CN | 103440208 A | 12/2013 |
| CN | 103677674 A | 3/2014 |
| CN | 103853670 A | 6/2014 |
| CN | 103905530 A | 7/2014 |
| CN | 104283960 A | 1/2015 |

* cited by examiner

ELECTRONIC DEVICE DATA OPERATION METHOD AND ELECTRONIC DEVICE FOR IMPROVED ELECTRONIC DEVICE STORAGE

CROSS-REFERENCE TO RELATED APPLICATIONS

This application is a national stage of International Application No. PCT/CN2016/087842, filed on Jun. 30, 2016, which is hereby incorporated by reference in its entirety.

TECHNICAL FIELD

The present invention relates to the field of storage technologies, and in particular, to an electronic device data operation method and an electronic device.

BACKGROUND

With intelligent development of an electronic device, limited internal storage space in the electronic device cannot fully meet a user requirement. Therefore, an increasing quantity of electronic devices start to support external storage space expansion, for example, secure digital (SD) card expansion. If only the internal storage space exists in the electronic device, default storage space of a system is the internal storage space. If a user performs expansion of the external storage space through the electronic device, for example, inserts one or more SD cards, the system requires the user to preset one storage space as the default storage space or use the internal storage space as the default storage space according to a factory setting. After the electronic device is used for a period of time, there may be a case in which storage space of a default memory is full and remaining storage space of a non-default memory is relatively large. In this case, the user needs to separately view a remaining space storage capacity of each storage space, and then manually sets a storage location of current data, so as to allocate storage resources. In addition, when reading data, the user also needs to separately view different storage space to query a storage location of data. This not only wastes storage resources of the electronic device, but also causes great inconvenience to the user.

SUMMARY

Embodiments of the present invention provide an electronic device data operation method and an electronic device, so as to improve storage resource utilization of the electronic device and convenience of a data operation.

A first aspect of embodiments of the present invention provides an electronic device data operation method, applied to an electronic device, where all storage space of the electronic device includes internal storage space and at least one external storage space, and the method includes:

receiving a data write instruction, where the data write instruction carries target write data;

selecting at least one of all the storage space as target storage space according to a preset rule, and performing a write operation in the target storage space; and after the write operation is completed, updating a virtual file that is obtained by summarizing and combining files of a same file type in all the storage space of the electronic device and that is stored in a virtual storage card, and updating a mapping relationship between a virtual storage path corresponding to the virtual storage card and a physical storage path corresponding to the target storage space.

In the foregoing technical solution, appropriate target storage space is selected according to the preset rule, so as to improve convenience of electronic device storage, and unified management and allocation of storage space are implemented by using the virtual storage card, so as to help improve storage resource utilization of the electronic device.

With reference to the first aspect, in a first possible implementation of the first aspect, the selecting at least one of all the storage space as target storage space according to a preset rule includes:

if a security level of the target write data meets a preset security threshold, selecting the internal storage space as the target storage space; if a security level of the target write data does not meet a preset security threshold, selecting the at least one external storage space as the target storage space; or if an occupied space amount of the target write data meets a preset space threshold, selecting the at least one external storage space as the target storage space; if an occupied space amount of the target write data does not meet a preset space threshold, selecting the internal storage space as the target storage space; or if the target write data is separable data and the occupied space amount is greater than any one storage space, selecting the internal space and/or the at least one external space as the target storage space; or if a storage location of the target write data is a secure storage area, selecting the at least one external storage space as the target storage space; if a storage location of the target write data is not a secure storage area, selecting the internal storage space as the target storage space.

With reference to the first aspect and the first possible implementation of the first aspect, in a second possible implementation of the first aspect, the method further includes:

if newly-added first external storage space is detected, generating the virtual storage card and a virtual file that is obtained by summarizing and combining files of a same file type in the external storage space and the internal storage space of the electronic device and that is stored in the virtual storage card, and establishing the mapping relationship between the virtual storage path corresponding to the virtual storage card and the physical storage path corresponding to the target storage space; or if at least one newly-added external storage space is detected and the at least one external storage space is not first external storage space, updating a virtual file that is obtained by summarizing and combining files of a same file type in the at least one added external storage space and all the storage space and that is stored in the virtual storage card, and updating a mapping relationship between the virtual storage path corresponding to the virtual storage card and a physical storage path corresponding to the at least one newly-added external storage space.

With reference to the first aspect, and the first and the second possible implementations of the first aspect, in a third possible implementation of the first aspect, the method further includes:

if it is detected that any one of the at least one external storage space is removed, updating, according to the at least one removed external storage space, the virtual file that is obtained by summarizing and combining the files of the same file type in all the storage space and that is stored in the virtual storage card; and releasing a mapping relationship between the virtual storage path corresponding to the virtual storage card and a physical storage path corresponding to the at least one removed external storage space.

With reference to the first aspect, and the first, the second, and the third possible implementations of the first aspect, in a fourth possible implementation of the first aspect, after the receiving a data write instruction, the method further includes:

determining whether the occupied space amount of the target write data meets a storage requirement of storage space of the electronic device;

if the occupied space amount of the target write data meets the storage requirement of the storage space of the electronic device, performing a step of selecting the at least one of all the storage space as the target storage space according to the preset rule; and if the occupied space amount of the target write data does not meet the storage requirement of the storage space of the electronic device, selecting a target storage device from at least one storage device that has performed a communication connection to the electronic device, and migrating target migration data to the target storage device, where the target migration data is a part or all of data that has been written into the electronic device.

In the foregoing technical solution, when the occupied space amount of the target write data does not meet the storage requirement of the storage space of the electronic device, storage space may be released by means of automatic data migration, so that the target write data is written. This facilitates flexible management of the storage space of the electronic device, and improves storage resource utilization of the electronic device.

With reference to the first aspect, and the first, the second, the third, and the fourth possible implementations of the first aspect, in a fifth possible implementation of the first aspect, the method further includes:

if a computer connection signal is detected, sending a driver file of the virtual storage card to a computer, and instructing the computer to install the driver file, so that the computer displays storage information of the virtual storage card.

With reference to the first aspect, and the first, the second, the third, the fourth, and the fifth possible implementations of the first aspect, in a sixth possible implementation of the first aspect, the method further includes:

receiving a data read instruction, where the data read instruction carries a target virtual storage path corresponding to target read data;

determining a target physical storage path mapped by the target virtual storage path; and reading the target read data by using the target physical storage path.

In the foregoing technical solution, the target read data is read in a form of the virtual storage card, and compared with searching and reading in each independent storage space, read efficiency is improved.

With reference to the first aspect, and the first, the second, the third, the fourth, the fifth, and the sixth possible implementations of the first aspect, in a seventh possible implementation of the first aspect, the method further includes:

receiving a data deletion instruction, where the data deletion instruction carries a target virtual storage path corresponding to target deletion data;

determining a target physical storage path mapped by the target virtual storage path; and deleting the target deletion data by using the target physical storage path.

A second aspect of embodiments of the present invention provides an electronic device, including:

a receiving unit, configured to receive a data write instruction, where the data write instruction carries target write data;

a selection unit, configured to select at least one of all storage space as target storage space according to a preset rule;

an operation unit, configured to perform a write operation in the target storage space; and an update unit, configured to: after the write operation is completed, update a virtual file that is obtained by summarizing and combining files of a same file type in all the storage space of the electronic device and that is stored in a virtual storage card, and update a mapping relationship between a virtual storage path corresponding to the virtual storage card and a physical storage path corresponding to the target storage space.

A third aspect of embodiments of the present invention provides an electronic device, including a display, at least one input device, a memory, and a processor, the memory stores a set of programs, and the processor is configured to invoke the programs stored in the memory, so that the device performs some or all of the implementations according to the first aspect.

A fourth aspect of embodiments of the present invention provides a graphical user interface on an electronic device, where the electronic device includes a display, at least one input device, a memory, and at least one processor configured to execute one or more programs stored in the memory, all storage space of the electronic device includes internal storage space and at least one external storage space, and the graphical user interface includes a virtual storage card icon that can be queried by a user;

a query operation that is performed by the user on storage information of the electronic device is detected; and responding to the detected query operation, the storage information on the virtual storage card is displayed, where the storage information on the virtual storage card includes a virtual file that is obtained by summarizing and combining files of a same file type in all the storage space of the electronic device.

A fifth aspect of embodiments of the present invention provides a computer-readable storage medium that stores one or more programs. The one or more programs include an instruction, and when being executed by an electronic device that includes a display and a plurality of application programs, the instruction is used to enable the computer-readable storage medium that stores the one or more programs and that is further provided in this embodiment of the present invention. The one or more programs include the instruction, and when being executed by the electronic device that includes the display and the plurality of the application programs, the instruction is used to enable the electronic device to perform some or all of the implementations according to the first aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the invention objectives, features, and advantages of the present invention clearer and more comprehensible, the following clearly describes the technical solutions in the embodiments of the present invention with reference to the accompanying drawings in the embodiments of the present invention. Apparently, the embodiments described are merely some but not all of the embodiments of the present invention. All other embodiments obtained by a person of ordinary skill in the art based on the embodiments of the present invention without creative efforts shall fall within the protection scope of the present invention.

In an embodiment of the present invention, an electronic device may include a user terminal such as a mobile phone, a computer, and a mobile Internet device (Mobile Internet Device, MID), or a server, or another electronic device that supports external storage space expansion such as SD card expansion.

Figure 1:
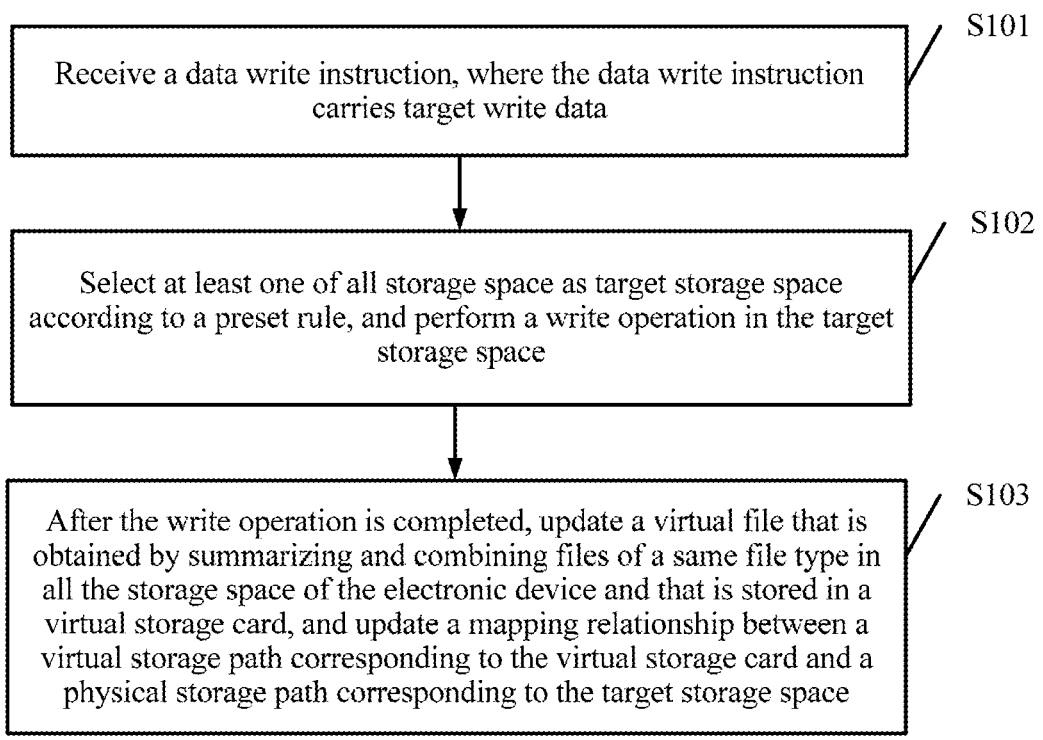
FIG. 1 is a schematic flowchart of an electronic device data operation method according to an embodiment of the present invention.

Referring to FIG. 1, FIG. 1 is a schematic flowchart of an electronic device data operation method according to an embodiment of the present invention. As shown in FIG. 1, the electronic device data operation method according to this embodiment of the present invention may include steps S101 to S103.

S101. Receive a data write instruction, where the data write instruction carries target write data.

Specifically, the electronic device receives the data write instruction, where the data write instruction carries the target write data. In this embodiment of the present invention, the electronic device may include an internal physical memory and at least one external physical memory. A user may input the target write data by using an input apparatus of the electronic device, for example, a touchscreen apparatus, or send the target write data to the electronic device from another electronic device. After the user triggers a data write operation, the electronic device receives the data write instruction. The data write instruction carries the target write data, and the target write data may be character information, or may be an audio/video file, a text document, or the like. When triggering the data write operation, the user may select a corresponding storage location. If the user directly and manually selects internal storage space or external storage space such as SD card storage, the electronic device does not need to automatically select storage space, and directly writes the target write data into the internal storage space or the external storage space. If the user chooses "automatic system selection" for the storage space, the system may automatically select the storage space according to a preset rule, and perform steps S102 and S103.

S102. Select at least one of all the storage space as target storage space according to a preset rule, and perform a write operation in the target storage space.

Specifically, the electronic device selects at least one of all the storage space as the target storage space according to the preset rule, and performs the write operation in the target storage space. When the user determines automatic system selection, after receiving the data write instruction, the electronic device may automatically select the target storage space according to the preset rule. The preset rule may be to select the target storage space according to at least one condition of the following: a location, a security level, a type, an occupied space amount, or the like of the target write data. For example, the target write data is password information, and the security level is relatively high. Therefore, it is determined that the password information is written into the internal storage space by determining that the security level of the target write data is relatively high. For another example, the target write data is a video file, and the occupied space amount is relatively large. To prevent a case in which a system running speed of the electronic device is affected because a relatively large memory is occupied, the video file with a relatively large occupied space amount may be stored in the external storage space.

S103. After the write operation is completed, update a virtual file that is obtained by summarizing and combining files of a same file type in all the storage space of the electronic device and that is stored in a virtual storage card, and update a mapping relationship between a virtual storage path corresponding to the virtual storage card and a physical storage path corresponding to the target storage space.

Specifically, after the write operation is completed, the electronic device updates the virtual file that is obtained by summarizing and combining the files of the same file type in all the storage space of the electronic device and that is stored in the virtual storage card, and updates the mapping relationship between the virtual storage path corresponding to the virtual storage card and the physical storage path corresponding to the target storage space. In this embodiment of the present invention, to ensure that the electronic device can uniformly manage the storage space, the virtual storage card may be added to the electronic device. For example, a file structure of "the virtual storage card" may be added to a file system of a mobile phone operating system, an actual path of storage content of the file structure of "the virtual storage card" is the internal storage space and/or the external storage space of the electronic device, and the storage content may include a virtual file that is obtained by combining a file structure of an internal storage card and a file structure of an external SD storage card. After the target write data is stored in the target storage space, the virtual file that is obtained by summarizing and combining the files of the same file type in all the storage space of the electronic device and that is stored in the virtual storage card may be updated. For example, if the target write data is the video file and has been written into an SD1 card, the target write data may be summarized into a virtual file of a video type, and a mapping relationship between a virtual storage path corresponding to the virtual file and the SD1 card is updated.

It may be learned from the foregoing that in this embodiment of the present invention, the data write instruction may be received, the at least one of all the storage space is selected as the target storage space according to the preset rule, and the write operation is performed in the target storage space. After the write operation is completed, the virtual file that is obtained by summarizing and combining the files of the same file type in all the storage space of the electronic device and that is stored in the virtual storage card is updated, and the mapping relationship between the virtual storage path corresponding to the virtual storage card and the physical storage path corresponding to the target storage space is updated. In this embodiment of the present invention, appropriate target storage space is automatically obtained by using the preset rule, so as to improve convenience of electronic device storage, and unified management and allocation of the storage space are implemented by using the virtual storage card, so as to help improve storage resource utilization of the electronic device.

Figure 2:
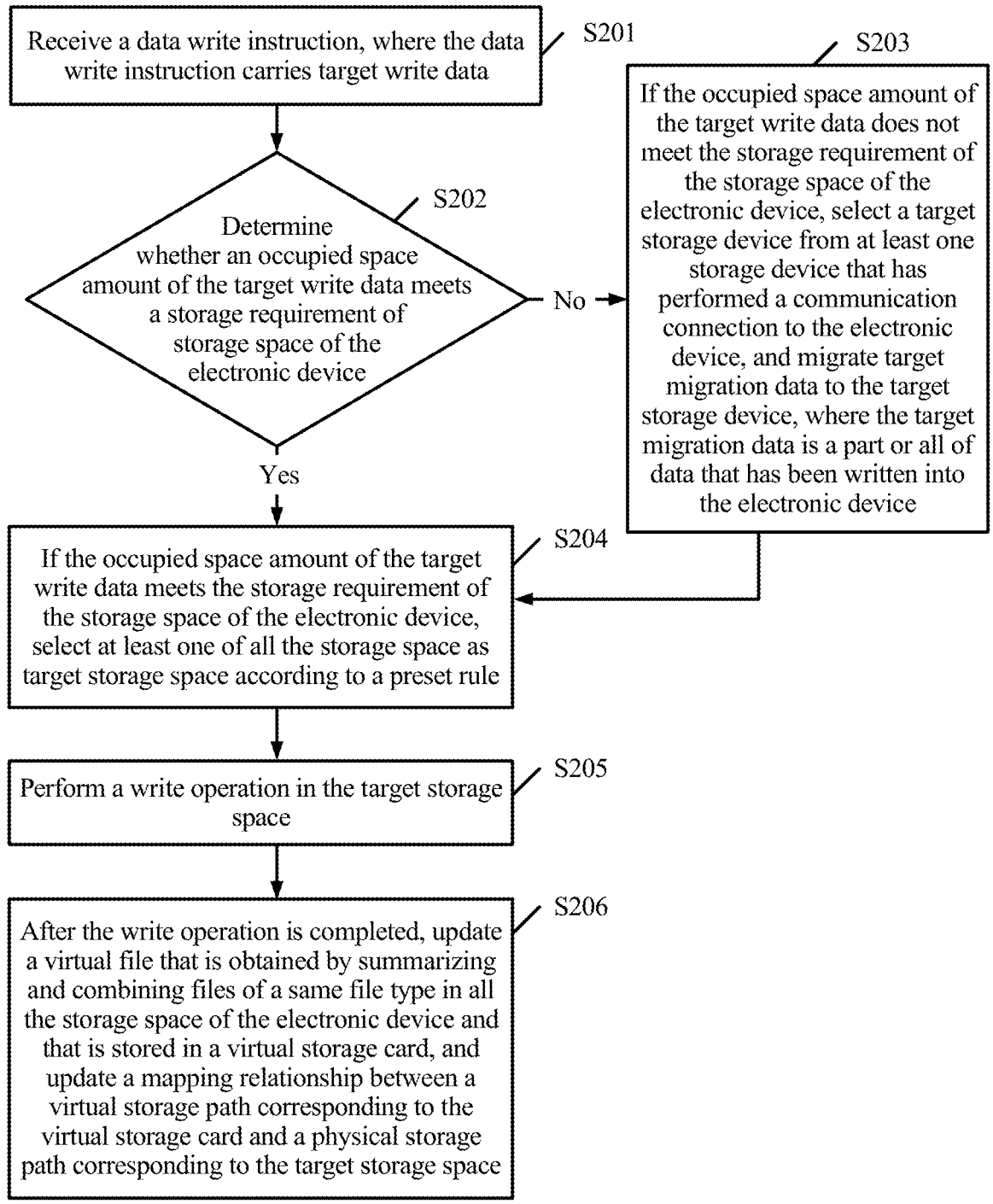
FIG. 2 is a schematic flowchart of another electronic device data operation method according to an embodiment of the present invention.

Referring to FIG. 2, FIG. 2 is a schematic flowchart of another electronic device data operation method according to an embodiment of the present invention. As shown in FIG. 2, the another electronic device data operation method according to this embodiment of the present invention may include steps S201 to S206.

S201. Receive a data write instruction, where the data write instruction carries target write data.

Specifically, the electronic device receives the data write instruction, where the data write instruction carries the target write data. In this embodiment of the present invention, the electronic device may include an internal physical memory and at least one external physical memory. A user may input the target write data by using an input apparatus of the electronic device, for example, a touchscreen apparatus, or send the target write data to the electronic device from another electronic device. After the user triggers a data write operation, the electronic device receives the data write instruction. The data write instruction carries the target write data, and the target write data may be character information, or may be an audio/video file, a text document, or the like. When triggering the data write operation, the user may select a corresponding storage location. If the user directly and manually selects internal storage space or external storage space such as SD card storage, the electronic device does not need to automatically select storage space, and directly writes the target write data into the internal storage space or the external storage space. If the user chooses "automatic system selection" for the storage space, the system may automatically select the storage space according to a preset rule, and may perform other steps in this embodiment of the present invention.

S202. Determine whether an occupied space amount of the target write data meets a storage requirement of storage space of the electronic device.

Specifically, the electronic device determines whether the occupied space amount of the target write data meets the storage requirement of the storage space of the electronic device. In this embodiment of the present invention, to ensure that the electronic device can uniformly manage the storage space, the virtual storage card may be added to the electronic device. For example, a file structure of "the virtual storage card" may be added to a file system of a mobile phone operating system, an actual path of storage content of the file structure of "the virtual storage card" is the internal storage space and/or the external storage space of the electronic device, and the storage content may include a virtual file that is obtained by combining a file structure of an internal storage card and a file structure of an external SD storage card. When choosing automatic system selection for the storage space, the user may obtain a total amount of storage space of the virtual storage card and a total amount of remaining space of the virtual storage card. If the storage requirement of the storage space of the electronic device is that after the target write data is written, the electronic device determines whether a total amount of remaining space of the storage space is greater than a preset threshold such as 10%, and may determine, according to a determining result, whether data migration in the storage space needs to be performed. If after the target write data is written, the electronic device determines that the total amount of the remaining space of the storage space is greater than the preset threshold, it indicates that the target write data may be directly written, and step S204 is performed. If the electronic device determines that the total amount of the remaining space of the storage space is not greater than the preset threshold, the data migration needs to be first performed, then the write operation of the target write data is performed, and step S203 may be performed.

S203. If the occupied space amount of the target write data does not meet the storage requirement of the storage space of the electronic device, select a target storage device from at least one storage device that has performed a communication connection to the electronic device, and migrate target migration data to the target storage device, where the target migration data is a part or all of data that has been written into the electronic device.

Specifically, if the occupied space amount of the target write data does not meet the storage requirement of the storage space of the electronic device, the electronic device selects the target storage device from the at least one storage device that has performed the communication connection to the electronic device, and migrates the target migration data to the target storage device, where the target migration data is the part or all of the data that has been written into the electronic device. In this embodiment of the present invention, if the occupied space amount of the target write data does not meet the storage requirement of the storage space of the electronic device, it indicates that remaining storage space in the electronic device cannot meet writing of the target write data. Therefore, some occupied storage space in the electronic device needs to be released. For example, when the electronic device is connected to a network, the part or all of the data in the electronic device is uploaded to a cloud. For another example, the electronic device may be connected to another storage device by using a WiFi hotspot, and then storage data in the electronic device is migrated to the another storage device according to a preset migration rule. The preset migration rule may be to migrate a photo in the electronic device to the another storage device according to a first-storage time, first-transferred rule until a size of migration data meets a preset requirement or remaining storage space of the electronic device after data migration can meet the storage requirement of the target write data.

S204. If the occupied space amount of the target write data meets the storage requirement of the storage space of the electronic device, select at least one of all the storage space as target storage space according to a preset rule.

Specifically, if the occupied space amount of the target write data meets the storage requirement of the storage space of the electronic device, the electronic device selects the at least one of all the storage space as the target storage space according to the preset rule. In this embodiment of the present invention, if the occupied space amount of the target write data meets the storage requirement of the storage space of the electronic device, the target storage space may be automatically selected according to the preset rule. The preset rule may be to select the target storage space according to at least one condition of the following: a location, a security level, a type, an occupied space amount, or the like of the target write data. For example, the target write data is password information, and the security level is relatively high. Therefore, it is determined that the password information is written into the internal storage space by determining that the security level of the target write data is relatively high. For another example, the target write data is a video file, and the occupied space amount is relatively large. To prevent a case in which a system running speed of the electronic device is affected because a relatively large memory is occupied, the video file with a relatively large occupied space amount may be stored in the external storage space.

Optionally, if the security level of the target write data meets a preset security threshold, the internal storage space is selected as the target storage space; if the security level of the target write data does not meet a preset security threshold, the at least one external storage space is selected as the target storage space.

In this embodiment of the present invention, the electronic device may select the target storage space by using the security level of the target write data, for example, the target write data is a password, and the security level of the target write data is relatively high. Because internal storage is securer and more stable and reliable, the internal storage space may be selected as the target storage space. For another example, the target write data is cache data, and the security level is relatively low. Therefore, the at least one external storage space may be selected as the target storage space. Optionally, the foregoing selection of the target storage space is not limited to the foregoing preset rule, and one of the external storage space may also be designated as the target storage space selected when the security level is relatively high.

Optionally, if the occupied space amount of the target write data meets a preset space threshold, the at least one external storage space is selected as the target storage space; if the occupied space amount of the target write data does not meet a preset space threshold, the internal storage space is selected as the target storage space.

In this embodiment of the present invention, to ensure smooth running of an electronic device system, that the target write data with a relatively large occupied space amount is written into the external storage space instead of the internal storage space may be set in the preset rule. For example, the occupied space amount of the target write data is 300 M and exceeds the preset space threshold 200 M, and one of the external storage space may be selected as the target storage space according to the preset rule.

Optionally, if the target write data is separable data and the occupied space amount is greater than any one storage space, the internal space and/or the at least one external space are/is selected as the target storage space.

In this embodiment of the present invention, when the occupied space amount of the target write data is relatively large, or when any one storage space cannot store the target write data, and a total remaining space storage capacity can satisfy writing of the target write data, whether the target write data is the separable data may be determined, that is, one part may be stored in the internal storage space, and the other part is stored in the external storage space. For example, when the target write data includes the text document and the video file, the text document and the video file may be respectively stored in the internal storage space and the external storage space according to a status of a remaining space storage capacity of each storage space, or stored in two different external storage space.

Optionally, if a storage location of the target write data is a secure storage area, the at least one external storage space is selected as the target storage space; if a storage location of the target write data is not a secure storage area, the internal storage space is selected as the target storage space.

In this embodiment of the present invention, it is assumed that a user carries the electronic device to store the target write data in a private place, the user may select the at least one external space as the target storage space; if the user carries the electronic device to store the target write data in a public place, the user may directly write current target write data into a system memory.

The foregoing optional any step may replace S204, or one or more steps may be combined for selection, for example, the target storage space may be determined according to the security level and the storage area of the target write data.

S205. Perform a write operation in the target storage space.

S206. After the write operation is completed, update a virtual file that is obtained by summarizing and combining files of a same file type in all the storage space of the electronic device and that is stored in a virtual storage card, and update a mapping relationship between a virtual storage path corresponding to the virtual storage card and a physical storage path corresponding to the target storage space.

For a detailed explanation of step S206, refer to the specific explanation of step S103 in an embodiment in FIG. 1, and details are not described herein again.

Further optionally, if newly-added first external storage space is detected, the virtual storage card and a virtual file that is obtained by summarizing and combining files of a same file type in the external storage space and the internal storage space of the electronic device and that is stored in the virtual storage card are generated, and the mapping relationship between the virtual storage path corresponding to the virtual storage card and the physical storage path corresponding to the target storage space is established.

The electronic device initially has only the internal storage space. After the user first inserts an SD card into the electronic device, the electronic device may detect the newly-added first external storage space, and generate the virtual storage card. Files of a same file type such as a video, an audio, and a document in the newly-added SD card and the internal storage space may be summarized and combined to form a plurality of virtual files, and the mapping relationship between the virtual storage path corresponding to the virtual storage card and the physical storage path corresponding to the target storage space may be separately established, for example, a mapping relationship between a video storage path in the virtual storage card and a physical storage path corresponding to the SD1 card may be established.

Further optionally, if at least one newly-added external storage space is detected and the at least one external storage space is not first external storage space, a virtual file that is obtained by summarizing and combining files of a same file type in the at least one added external storage space and all the storage space and that is stored in the virtual storage card is updated, and a mapping relationship between the virtual storage path corresponding to the virtual storage card and a physical storage path corresponding to the at least one newly-added external storage space is updated.

The electronic device has the internal storage space and the external storage space. After the user adds the new external storage space, for example, inserts an SD2 card into the electronic device, a source virtual file in the virtual storage card needs to be updated with reference to a storage file in the new external storage space. For example, if there is a 300 M video file in the SD2 card, a total occupied space amount of an original virtual video file can be increased by 300 M, total storage capacity in the virtual storage card can be increased by 300 M, and a mapping relationship between a virtual storage path of a video stored in the virtual storage card and a physical storage path corresponding to the SD2 card may be established.

Further optionally, if it is detected that any one of the at least one external storage space is removed, the virtual file that is obtained by summarizing and combining the files of the same file type in all the storage space and that is stored in the virtual storage card is updated according to the at least one removed external storage space; and a mapping relationship between the virtual storage path corresponding to the virtual storage card and a physical storage path corresponding to the at least one removed external storage space is released.

If the electronic device has the internal storage space and two external storage space: the SD1 card and the SD2 card, and the user removes the SD1 card, after detecting that the SD1 card is removed, the electronic device may delete information about the SD card from the virtual file stored in the virtual storage card. For example, 100 M document information content is stored in the SD1 card whose capacity is 1 G, the total storage capacity of the virtual storage card can be reduced by 1 G the remaining space storage capacity is reduced by 900 M, and then a total storage capacity of a virtual document/file is reduced by 100 M. Then, the mapping relationship between the physical storage path corresponding to the SD1 card and the virtual storage path of the virtual storage card may be released.

Further optionally, if a computer connection signal is detected, a driver file of the virtual storage card is sent to the computer, and the computer is instructed to install the driver file, so that the computer displays storage information of the virtual storage card.

It is detected that the electronic device is connected to the computer by using a USB port, or the like, and the electronic device may automatically send the driver file of the virtual storage card to the computer, so that the computer automatically installs the driver file. After the driver file is successfully installed, a "virtual storage card" icon may be displayed in a computer interface, and after the icon is opened, a response virtual file corresponding to the virtual storage card may be seen, so that the user can conveniently perform copy-in, copy-out, and another file management operation.

Further optionally, a data read instruction is received, where the data read instruction carries a target virtual storage path corresponding to target read data; a target physical storage path mapped by the target virtual storage path is determined; and the target read data is read by using the target physical storage path.

User equipment receives the data read instruction, and may obtain, according to the data read instruction, the target virtual storage path corresponding to the target read data that needs to be read, for example, the user taps and accesses "the virtual storage card" and further taps a video icon, and this index directory is the target virtual storage path, and then may obtain the physical storage path according to the target virtual storage path, that is, read the target read data from the internal storage space or the external storage space.

Further optionally, a data deletion instruction is received, where the data deletion instruction carries a target virtual storage path corresponding to target deletion data; a target physical storage path mapped by the target virtual storage path is determined; and the target deletion data is deleted by using the target physical storage path.

The user equipment receives the data deletion instruction, and may obtain, according to the data deletion instruction, the target virtual storage path corresponding to the target deletion data that needs to be deleted, then obtain the physical storage path, and delete the target deletion data stored in the internal storage space or the external storage space.

It may be learned that in this embodiment of the present invention, whether to select the target storage space according to the preset rule is determined by receiving the data write instruction, and by determining whether the occupied space amount of the target write data meets the storage requirement of the storage space of the electronic device. Alternatively, the data migration is first performed, and then the target storage space is selected. After the write operation is completed, the virtual file stored in the virtual storage card and the mapping relationship between the virtual storage path corresponding to the virtual storage card and the physical storage path corresponding to the target storage space are updated. The target storage space is automatically selected, and the remaining space storage capacity is adjusted by means of the data migration, so as to improve convenience and flexibility of the electronic device, and unified management and allocation of the storage space are implemented by using the virtual storage card, so as to help improve storage resource utilization of the electronic device.

Referring to FIG. 3a to FIG. 3d, FIG. 3a to FIG. 3d are respectively schematic diagrams of a storage location setting interface, an internal storage space storage interface and an external storage space storage interface, a virtual storage card interface, and a classification storage interface of a virtual storage card in an electronic device according to the present invention.

A query operation that is performed by a user on storage information of the electronic device is detected; and responding to the detected query operation, the storage information on the virtual storage card is displayed. The storage information on the virtual storage card includes a virtual file that is obtained by summarizing and combining files of a same file type in all storage space of the electronic device.

Figure 3A:
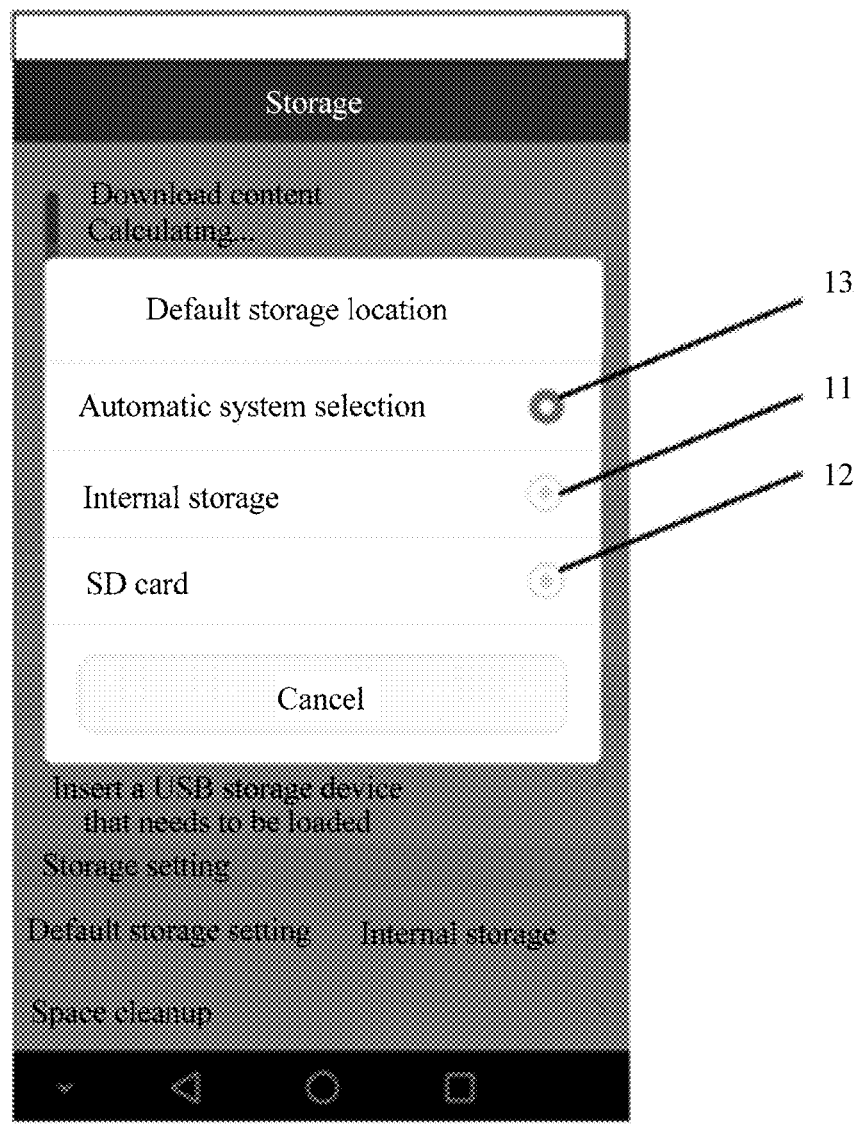
FIG. 3*a* is a schematic diagram of a storage location setting interface of an electronic device according to an embodiment of the present invention.
Figure 3B:
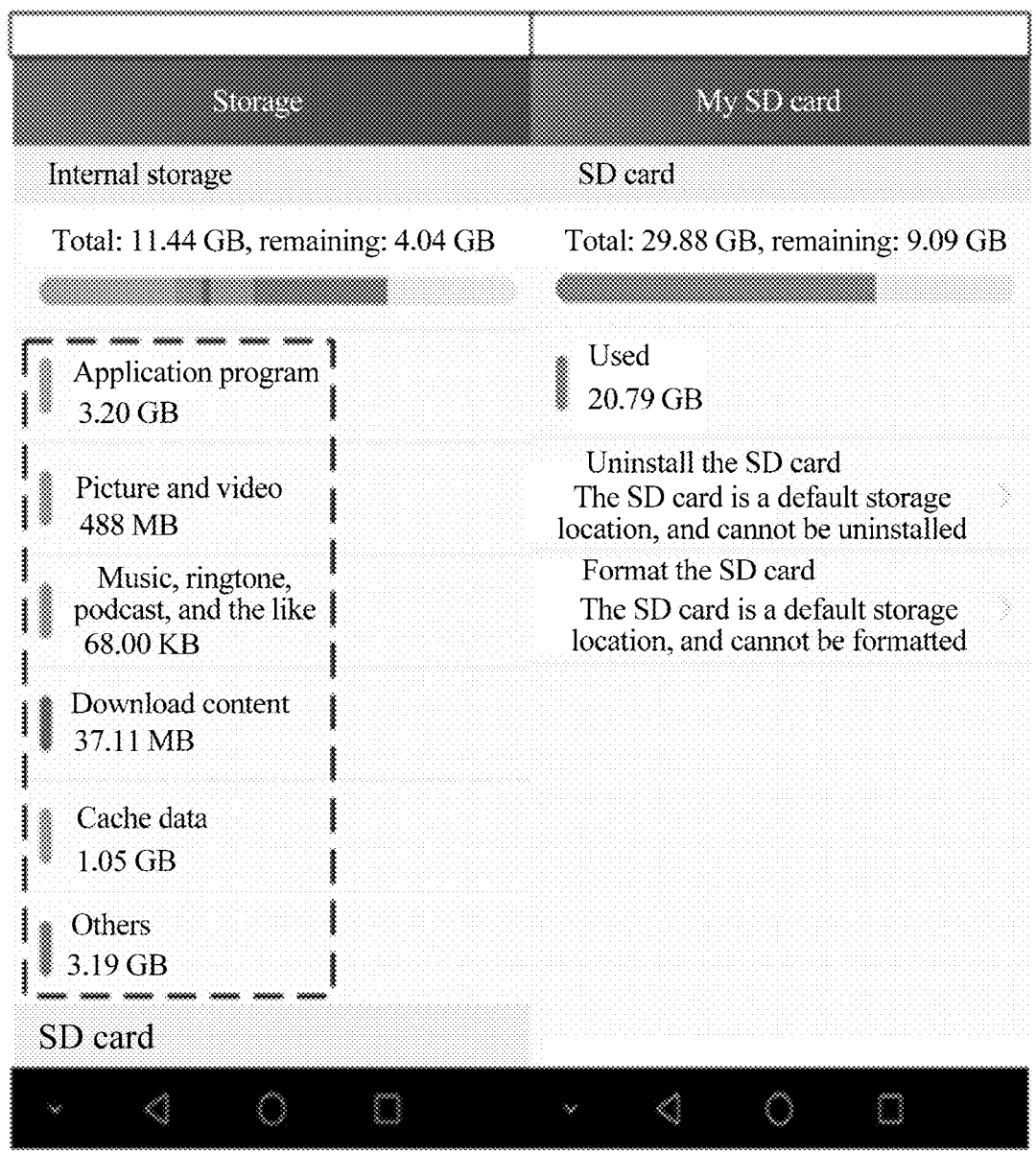
FIG. 3*b* is a schematic diagram of an internal storage space storage interface and an external storage space storage interface according to an embodiment of the present invention.

Specifically, when the user wants to perform the query operation on the storage information of the electronic device, and may first tap the storage location setting interface to select a corresponding storage location, the interface in FIG. 3a includes three buttons: internal storage 11, SD card 12, and automatic system selection 13. If the user directly and manually selects the internal storage 11 or the SD card 12, the electronic device does not need to automatically select storage space, and may directly write target write data into internal storage space or external storage space according to the selection. When the user taps the internal storage 11 or the SD card 12, the internal storage space storage interface and the external storage space storage interface shown in FIG. 3b is displayed. An internal storage space interface and an external storage space storage interface are independent interfaces in the interface, and can be separately displayed. The internal storage space may classify stored files into an application program type, a picture/video type, a music/ringtone/podcast type or a like type, a download content type, a cache data type, another type, and the like for displaying. SD card storage may display a total storage space amount and a remaining storage space amount, or may display stored files after type classification.

Figure 3C:
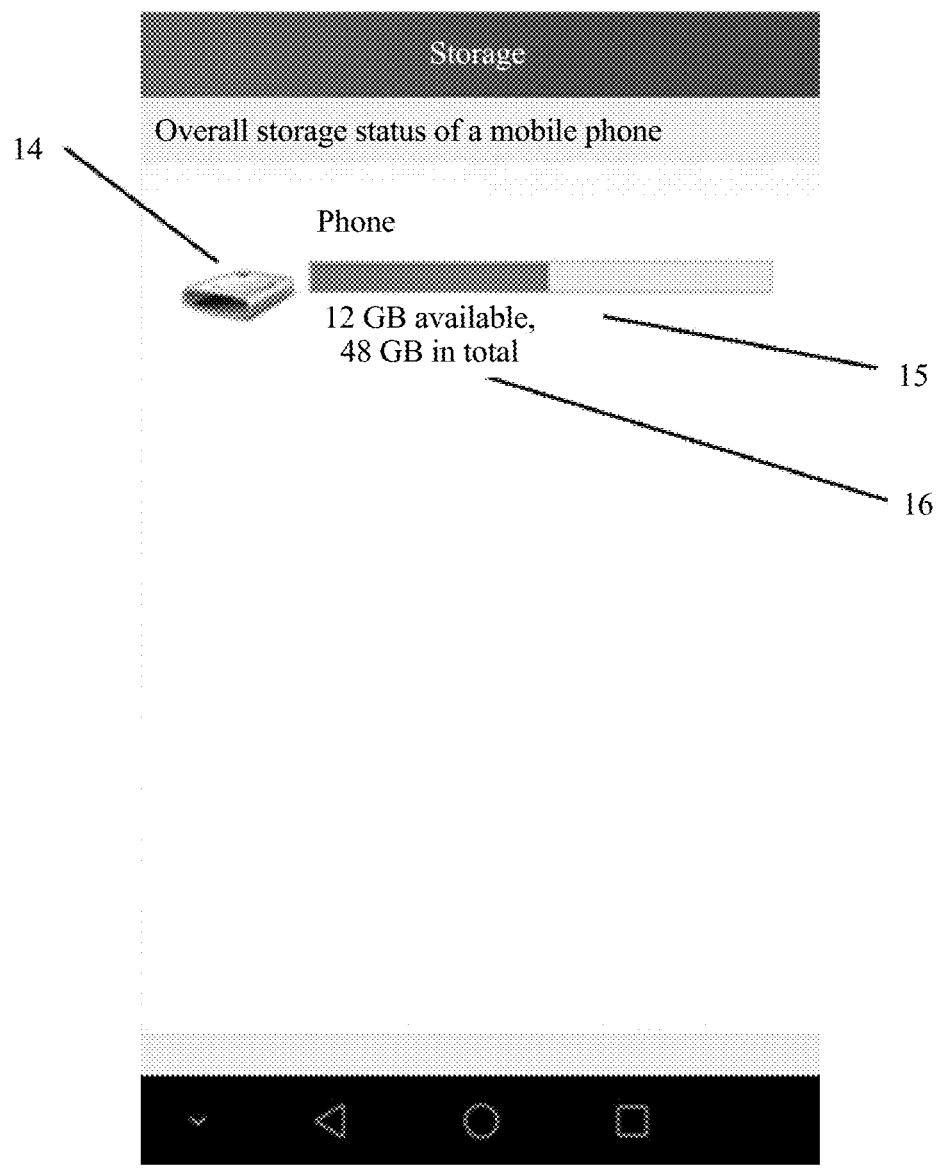
FIG. 3*c* is a schematic diagram of a virtual storage card interface of an electronic device according to an embodiment of the present invention.
Figure 3D:
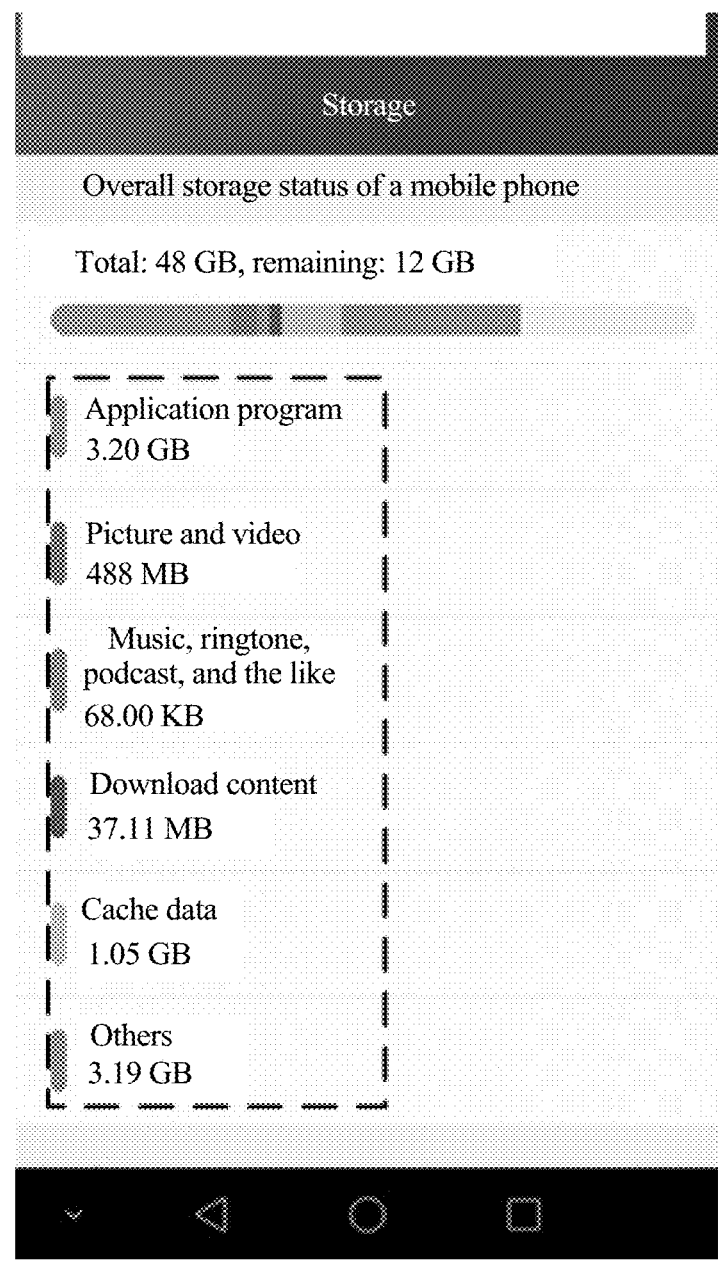
FIG. 3*d* is a schematic diagram of a classification storage interface of a virtual storage card of an electronic device according to an embodiment of the present invention.

If the user taps the automatic system selection 13 in FIG. 3a, a system may automatically make a selection according to a preset rule, and an interface shown in FIG. 3c may be displayed, and FIG. 3c is a schematic diagram of the virtual storage card interface. A virtual storage card icon 14 includes total storage space 15 that includes internal storage space and external storage space, and total remaining storage space 16. A storage status may be further queried by tapping the virtual storage card icon, and the classification storage interface of the virtual storage card shown in FIG. 3d is displayed. In the interface, files in all the storage space, including the internal storage space and the external storage space, of the electronic device may be summarized and combined to generate the virtual file, and various types of storage information such as an application program type and a picture/video type may be displayed.

Optionally, an addition operation that is performed by the user on first external storage space is detected; and responding to the detected space addition operation, a mapping relationship between a virtual storage path corresponding to the virtual storage card and a physical storage path corresponding to all the storage space is established, and the storage information on the virtual storage card is displayed. The storage information on the virtual storage card includes a virtual file that is obtained by summarizing and combining files of a same file type in the first external storage space and the internal storage space of the electronic device.

The electronic device initially has only the internal storage space. When the user first expands the external storage space, for example, inserts an SD card, the electronic device detects the addition operation of the external storage space and may respond to the space addition operation, and the mapping relationship between the virtual storage path corresponding to the virtual storage card and the physical storage path corresponding to all the storage space is established. Original storage information of the internal storage space is no longer displayed, and a graphical user interface generates and displays a virtual storage card icon, for example, the interface shown in FIG. 3c. The storage information of the virtual storage card may be displayed by further tapping the virtual storage card icon. The storage information of the virtual storage card includes the virtual file that is obtained by summarizing and combining all the files in the internal storage space and the newly-added SD card, for example, the interface shown in FIG. 3d.

Optionally, a removal operation that is performed by the user on the at least one external storage space is detected; and responding to the detected space removal operation, a mapping relationship between a virtual storage path corresponding to the virtual storage card and a physical storage path corresponding to all the storage space is updated, and updated storage information on the virtual storage card is displayed. The updated storage information on the virtual storage card includes a virtual file that is obtained by summarizing and combining files of a same file type in all the storage space of the electronic device other than the at least one removed external storage space.

When the user removes an SD card, the electronic device detects the removal operation of the external storage space and may respond to the space removal operation, and the mapping relationship between the virtual storage path corresponding to the virtual storage card and the physical storage path corresponding to all the storage space is updated. Original virtual storage files are updated for displaying, and the total storage space amount and the remaining storage space amount in the interface shown in FIG. 3c are adjusted according to storage space of the removed SD card and an occupied space amount of files stored on the original SD card. After the virtual storage card icon is further tapped, the updated storage information of the virtual storage card may be displayed.

In this embodiment of the present invention, the graphical user interface of "the virtual storage card" is used, so that the user can conveniently read, write, and query the storage information, and manage the storage space, and storage information of a plurality of storage space is summarized and combined for convenience of the user to read.

Figure 4:
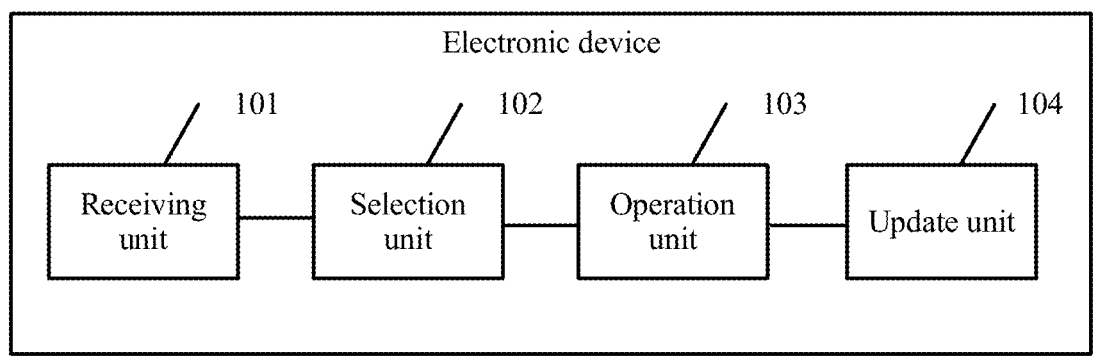
FIG. 4 is a schematic modular diagram of an electronic device according to an embodiment of the present invention.

Referring to FIG. 4, FIG. 4 is a schematic modular diagram of an electronic device according to an embodiment of the present invention. As shown in FIG. 4, the electronic device may include: a receiving unit 101, a selection unit 102, an operation unit 103, and an update unit 104.

The receiving unit 101 is configured to receive a data write instruction, where the data write instruction carries target write data.

The selection unit 102 is configured to select at least one of all the storage space as target storage space according to a preset rule.

The operation unit 103 is configured to perform a write operation in the target storage space.

The update unit 104 is configured to: after the write operation is completed, update a virtual file that is obtained by summarizing and combining files of a same file type in all the storage space of the electronic device and that is stored in a virtual storage card, and update a mapping relationship between a virtual storage path corresponding to the virtual storage card and a physical storage path corresponding to the target storage space.

For specific explanations of the foregoing units, refer to the method embodiment shown in FIG. 1, and details are not described herein again.

Figure 5:
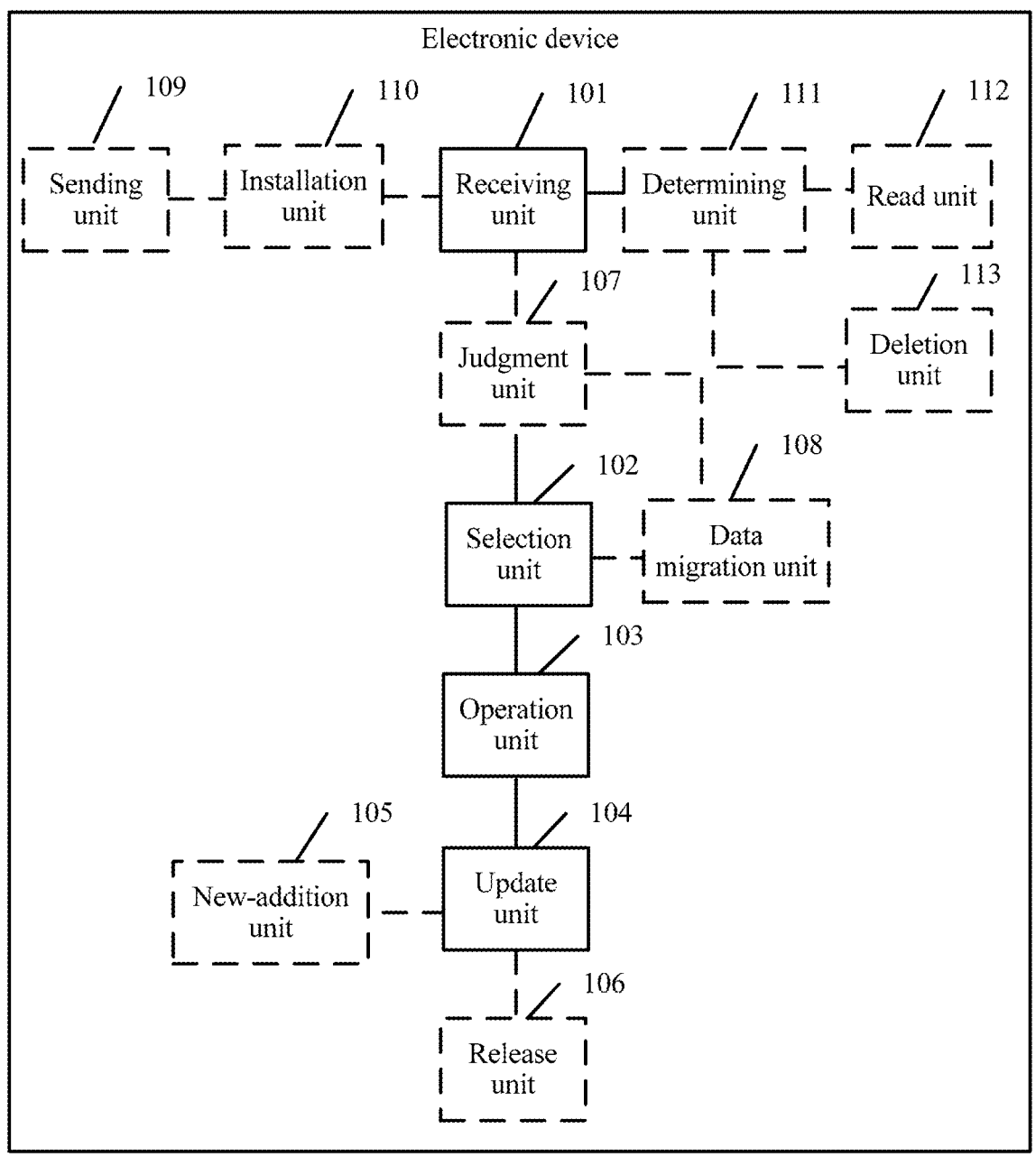
FIG. 5 is a schematic modular diagram of another electronic device according to an embodiment of the present invention.

Referring to FIG. 5, FIG. 5 is a schematic modular diagram of an electronic device according to another embodiment of the present invention. As shown in FIG. 5, the electronic device may include: a receiving unit 101, a selection unit 102, an operation unit 103, an update unit 104, a new-addition unit 105, a release unit 106, a judgment unit 107, a data migration unit 108, a sending unit 109, an installation unit 110, a determining unit 111, a read unit 112, and a deletion unit 113.

The receiving unit 101 is configured to receive a data write instruction, where the data write instruction carries target write data.

The selection unit 102 is configured to select at least one of all the storage space as target storage space according to a preset rule.

Optionally, the selection unit 102 is specifically configured to: if a security level of the target write data meets a preset security threshold, select the internal storage space as the target storage space; if a security level of the target write data does not meet a preset security threshold, select the at least one external storage space as the target storage space; or if an occupied space amount of the target write data meets a preset space threshold, select the at least one external storage space as the target storage space; if an occupied space amount of the target write data does not meet a preset space threshold, select the internal storage space as the target storage space; or if the target write data is separable data and the occupied space amount is greater than any one storage space, select the internal space and/or the at least one external space as the target storage space; or if a storage location of the target write data is a secure storage area, select the at least one external storage space as the target storage space; if a storage location of the target write data is not a secure storage area, select the internal storage space as the target storage space.

The operation unit 103 is configured to perform a write operation in the target storage space.

The update unit 104 is configured to: after the write operation is completed, update a virtual file that is obtained by summarizing and combining files of a same file type in all the storage space of the electronic device and that is stored in a virtual storage card, and update a mapping relationship between a virtual storage path corresponding to the virtual storage card and a physical storage path corresponding to the target storage space.

The new-addition unit 105 is configured to: if newly-added first external storage space is detected, generate the virtual storage card and a virtual file that is obtained by summarizing and combining files of a same file type in the external storage space and the internal storage space of the electronic device and that is stored in the virtual storage card, and establish the mapping relationship between the virtual storage path corresponding to the virtual storage card and the physical storage path corresponding to the target storage space; or if at least one newly-added external storage space is detected and the at least one external storage space is not first external storage space, update a virtual file that is obtained by summarizing and combining files of a same file type in the at least one added external storage space and all the storage space and that is stored in the virtual storage card, and update a mapping relationship between the virtual storage path corresponding to the virtual storage card and a physical storage path corresponding to the at least one newly-added external storage space.

The update unit 104 is further configured to: if it is detected that any one of the at least one external storage space is removed, update, according to the at least one removed external storage space, the virtual file that is obtained by summarizing and combining the files of the same file type in all the storage space and that is stored in the virtual storage card.

The release unit 106 is configured to release a mapping relationship between the virtual storage path corresponding to the virtual storage card and a physical storage path corresponding to the at least one removed external storage space.

The judgment unit 107 is configured to determine whether the occupied space amount of the target write data meets a storage requirement of storage space of the electronic device.

The selection unit 102 is further configured to: if the occupied space amount of the target write data meets the storage requirement of the storage space of the electronic device, select the at least one of all the storage space as the target storage space according to the preset rule.

The data migration unit 108 is configured to: if the occupied space amount of the target write data does not meet the storage requirement of the storage space of the electronic device, select a target storage device from at least one storage device that has performed a communication connection to the electronic device, and migrate target migration data to the target storage device, where the target migration data is a part or all of data that has been written into the electronic device.

The sending unit 109 is configured to: if a computer connection signal is detected, send a driver file of the virtual storage card to the computer.

The installation unit 110 is configured to instruct the computer to install the driver file, so that the computer displays storage information of the virtual storage card.

The receiving unit 101 is configured to receive a data read instruction, where the data read instruction carries a target virtual storage path corresponding to target read data.

The determining unit 111 is configured to determine a target physical storage path mapped by the target virtual storage path.

The read unit 112 is configured to read the target read data by using the target physical storage path.

The receiving unit 101 is configured to receive a data deletion instruction, where the data deletion instruction carries a target virtual storage path corresponding to target deletion data.

The determining unit 111 is further configured to determine a target physical storage path mapped by the target virtual storage path.

The deletion unit 113 is configured to delete the target deletion data by using the target physical storage path.

For specific explanations of the foregoing units in the foregoing embodiment, refer to the method embodiment shown in FIG. 2, and details are not described herein again.

Figure 6:
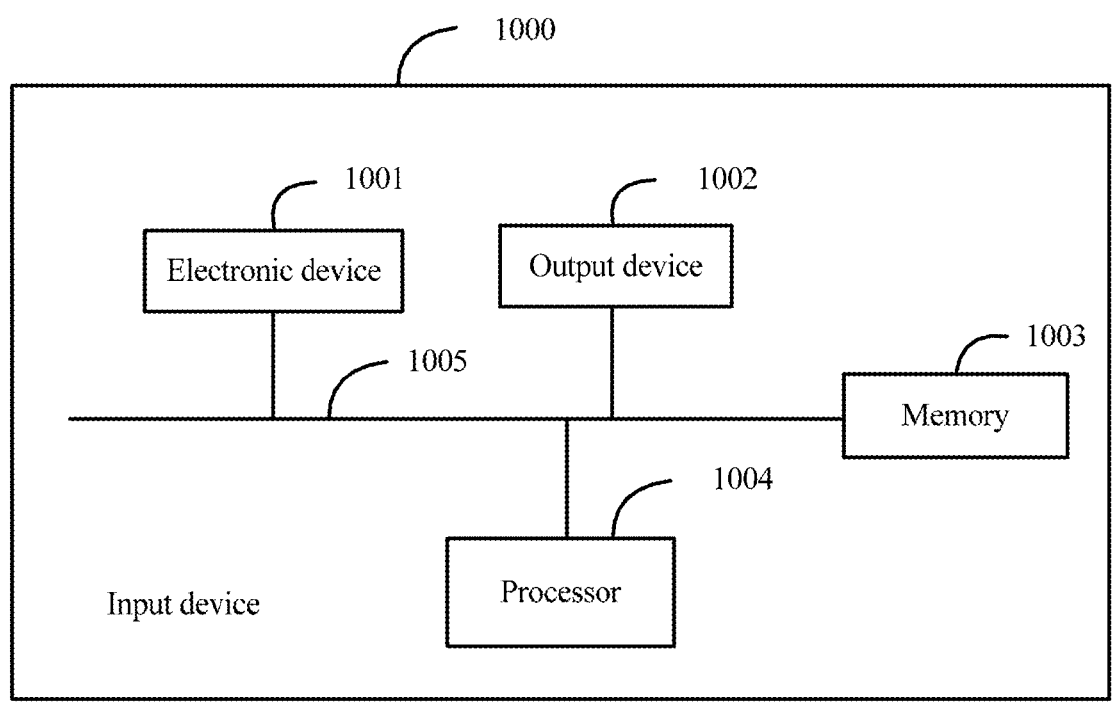
FIG. 6 is a schematic structural diagram of an electronic device according to an embodiment of the present invention.

Referring to FIG. 6, FIG. 6 describes an electronic device provided in an embodiment of the present invention. Referring to FIG. 6, FIG. 6 is a schematic structural diagram of an electronic device 1000 according to an embodiment of the present invention. As shown in FIG. 6, the electronic device may include an output device 1001 such as a display, at least one input device 1002 such as a keyboard and a mouse, a memory 1003, a processor 1004 such as a CPU, and at least one communications bus 1005. The memory 1003 may include a high-speed RAM memory, and may further include a nonvolatile memory (non-volatile memory), for example, at least one magnetic disk memory. The communications bus 1005 is configured to implement connection and communication between these components. The processor is configured to execute and save one or more programs in the memory.

Specifically, the processor 1004 is configured to invoke a program stored in the memory 1003 to perform the following operations:

receiving a data write instruction, where the data write instruction carries target write data;

selecting at least one of all the storage space as target storage space according to a preset rule, and performing a write operation in the target storage space; and after the write operation is completed, updating a virtual file that is obtained by summarizing and combining files of a same file type in all the storage space of the electronic device and that is stored in a virtual storage card, and updating a mapping relationship between a virtual storage path corresponding to the virtual storage card and a physical storage path corresponding to the target storage space.

In an embodiment, the selecting at least one of all the storage space as target storage space according to a preset rule includes:

if a security level of the target write data meets a preset security threshold, selecting the internal storage space as the target storage space; if a security level of the target write data does not meet a preset security threshold, selecting the at least one external storage space as the target storage space; or if an occupied space amount of the target write data meets a preset space threshold, selecting the at least one external storage space as the target storage space; if an occupied space amount of the target write data does not meet a preset space threshold, selecting the internal storage space as the target storage space; or if the target write data is separable data and the occupied space amount is greater than any one storage space, selecting the internal space and/or the at least one external space as the target storage space; or if a storage location of the target write data is a secure storage area, selecting the at least one external storage space as the target storage space; if a storage location of the target write data is not a secure storage area, selecting the internal storage space as the target storage space.

In an embodiment, if newly-added first external storage space is detected, the virtual storage card and a virtual file that is obtained by summarizing and combining files of a same file type in the external storage space and the internal storage space of the electronic device and that is stored in the virtual storage card are generated, and the mapping relationship between the virtual storage path corresponding to the virtual storage card and the physical storage path corresponding to the target storage space is established; or if at least one newly-added external storage space is detected and the at least one external storage space is not first external storage space, a virtual file that is obtained by summarizing and combining files of a same file type in the at least one added external storage space and all the storage space and that is stored in the virtual storage card is updated, and a mapping relationship between the virtual storage path corresponding to the virtual storage card and a physical storage path corresponding to the at least one newly-added external storage space is updated.

In an embodiment, if it is detected that any one of the at least one external storage space is removed, the virtual file that is obtained by summarizing and combining the files of the same file type in all the storage space and that is stored in the virtual storage card is updated according to the at least one removed external storage space; and a mapping relationship between the virtual storage path corresponding to the virtual storage card and a physical storage path corresponding to the at least one removed external storage space is released.

In an embodiment, after the receiving a data write instruction, the following operation is further included:

determining whether the occupied space amount of the target write data meets a storage requirement of storage space of the electronic device; if the occupied space amount of the target write data meets the storage requirement of the storage space of the electronic device, performing a step of selecting the at least one of all the storage space as the target storage space according to the preset rule; if the occupied space amount of the target write data does not meet the storage requirement of the storage space of the electronic device, selecting a target storage device from at least one storage device that has performed a communication connection to the electronic device, and migrating target migration data to the target storage device, where the target migration data is a part or all of data that has been written into the electronic device.

In an embodiment, if a computer connection signal is detected, a driver file of the virtual storage card is sent to the computer, and the computer is instructed to install the driver file, so that the computer displays storage information of the virtual storage card.

In an embodiment, the following operation is further included: receiving a data read instruction, where the data read instruction carries a target virtual storage path corresponding to target read data; determining a target physical storage path mapped by the target virtual storage path; and reading the target read data by using the target physical storage path.

In an embodiment, the following operation is further included: receiving a data deletion instruction, where the data deletion instruction carries a target virtual storage path corresponding to target deletion data; determining a target physical storage path mapped by the target virtual storage path; and deleting the target deletion data by using the target physical storage path.

For specific explanations in the foregoing embodiments, refer to the method embodiment shown in FIG. 1 and FIG. 2, and details are not described herein again.

An embodiment of the present invention further provides a computer-readable storage medium that stores one or more programs. The one or more programs include an instruction, and when being executed by an electronic device that includes a display and a plurality of application programs, the instruction is used to enable the computer-readable storage medium that stores the one or more programs and that is further provided in this embodiment of the present invention. The one or more programs include the instruction, and when being executed by the electronic device that includes the display and the plurality of the application programs, the instruction is used to enable the electronic device to perform the method described in FIG. 1 and FIG. 2.

A person of ordinary skill in the art may understand that all or a part of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. An electronic device data operation method, applied to an electronic device, wherein all storage space of the electronic device comprises internal storage space and at least one external storage space, and the method comprises:

receiving a data write instruction, wherein the data write instruction carries target write data;

selecting at least one of all the storage space as target storage space according to a preset rule, wherein the preset rule comprises:

selecting the internal storage space as the target storage space when a security level of the target write data meets a preset security threshold; and selecting the at least one external storage space as the target storage space when the security level of the target write data does not meet the preset security threshold;

performing a write operation in the target storage space according to the preset rule;

after the write operation is completed, summarizing and combining files of a same file type in all the storage space of the electronic device to obtain a virtual file;

storing the virtual file in a virtual storage card and updating the virtual file that is obtained by summarizing and combining files of the same file type in all the storage space of the electronic device; and updating a mapping relationship between a virtual storage path corresponding to the virtual storage card and a physical storage path corresponding to the target storage space.

2. The method according to claim 1, wherein the selecting at least one of all the storage space as target storage space according to the preset rule further comprises:

selecting the at least one external storage space as the target storage space when an occupied space amount of the target write data meets a preset space threshold; and selecting the internal storage space as the target storage space when the occupied space amount of the target write data does not meet the preset space threshold.

3. The method according to claim 1, wherein the method further comprises:

generating the virtual storage card and a virtual file when a newly-added first external storage space is detected; and establishing the mapping relationship between the virtual storage path corresponding to the virtual storage card and the physical storage path corresponding to the target storage space.

4. The method according to claim 1, wherein the method further comprises:

updating, according to at least one removed external storage space, the virtual file that is obtained by summarizing and combining the files of the same file type in all the storage space and that is stored in the virtual storage card when it is detected that any one of the at least one external storage space is removed; and releasing a mapping relationship between the virtual storage path corresponding to the virtual storage card and a physical storage path corresponding to the at least one removed external storage space.

5. The method according to claim 1, after the receiving a data write instruction, further comprising:

determining whether an occupied space amount of the target write data meets a storage requirement of storage space of the electronic device, wherein the storage requirement comprises storage size;

performing a step of selecting the at least one of all the storage space as the target storage space according to the preset rule when the occupied space amount of the target write data meets the storage requirement of the storage space of the electronic device; and selecting a target storage device from at least one storage device that has performed a communication connection to the electronic device when the occupied space amount of the target write data does not meet the storage requirement of the storage space of the electronic device, and migrating target migration data to the target storage device, wherein the target migration data is a part or all of data that has been written into the electronic device.

6. The method according to claim 1, wherein the method further comprises:

if a computer connection signal is detected, sending a driver file of the virtual storage card to a computer, and instructing the computer to install the driver file, so that the computer displays storage information of the virtual storage card.

7. The method according to claim 1, wherein the method further comprises:

receiving a data read instruction, wherein the data read instruction carries a target virtual storage path corresponding to target read data;

determining a target physical storage path mapped by the target virtual storage path; and reading the target read data by using the target physical storage path.

8. The method according to claim 1, wherein the method further comprises:

receiving a data deletion instruction, wherein the data deletion instruction carries a target virtual storage path corresponding to target deletion data;

determining a target physical storage path mapped by the target virtual storage path; and deleting the target deletion data by using the target physical storage path.

9. A non-transitory computer-readable storage medium comprising instructions which, when executed by a computer, cause the computer to carry out the method of claim 1.

10. The method according to claim 1, wherein the selecting at least one of all the storage space as target storage space according to the preset rule further comprises:

selecting the internal space and/or the at least one external space as the target storage space when the target write data is separable data and the occupied space amount is greater than any one storage space.

11. The method according to claim 1, wherein the selecting at least one of all the storage space as target storage space according to the preset rule further comprises:

selecting the at least one external storage space as the target storage space when a storage location of the target write data is a secure storage area; and selecting the internal storage space as the target storage space when a storage location of the target write data is not a secure storage area.

12. An electronic device, wherein the electronic device comprises a display, at least one input device, an internal storage space and at least one external storage space, a memory, and a processor, the memory stores a set of programs, and the processor is configured to invoke the programs stored in the memory, so that the device performs a method comprising:

receiving a data write instruction, wherein the data write instruction carries target write data;

selecting at least one of the internal storage space and the at least one external storage space as target storage space according to a preset rule, wherein the preset rule comprises:

selecting the internal storage space as the target storage space when a security level of the target write data meets a preset security threshold; and selecting the at least one external storage space as the target storage space when the security level of the target write data does not meet the preset security threshold;

performing a write operation in the target storage space according to the preset rule;

after the write operation is completed, summarizing and combining files of a same file type in all the storage space of the electronic device to obtain a virtual file;

storing the virtual file in a virtual storage card and updating the virtual file that is obtained by summarizing and combining files of the same file type in all the storage space of the electronic device; and updating a mapping relationship between a virtual storage path corresponding to the virtual storage card and a physical storage path corresponding to the target storage space.

13. The electronic device according to claim 12, wherein the selecting at least one of all the storage space as target storage space according to the preset rule further comprises:

selecting the at least one external storage space as the target storage space when an occupied space amount of the target write data meets a preset space threshold; and selecting the internal storage space as the target storage space when the occupied space amount of the target write data does not meet the preset space threshold.

14. The method according to claim 12, wherein the method performed further comprises:

generating the virtual storage card and a virtual file when a newly-added first external storage space is detected; and establishing the mapping relationship between the virtual storage path corresponding to the virtual storage card and the physical storage path corresponding to the target storage space.

15. The method according to claim 12, wherein the method performed further comprises:

updating, according to at least one removed external storage space, the virtual file that is obtained by summarizing and combining the files of the same file type in all the storage space and that is stored in the virtual storage card when it is detected that any one of the at least one external storage space is removed; and releasing a mapping relationship between the virtual storage path corresponding to the virtual storage card and a physical storage path corresponding to the at least one removed external storage space.

16. The method according to claim 12, after the receiving a data write instruction, further comprising:

determining whether an occupied space amount of the target write data meets a storage requirement of storage space of the electronic device, wherein the storage requirement comprises storage size;

performing a step of selecting the at least one of all the storage space as the target storage space according to the preset rule when the occupied space amount of the target write data meets the storage requirement of the storage space of the electronic device; and selecting a target storage device from at least one storage device that has performed a communication connection to the electronic device when the occupied space amount of the target write data does not meet the storage requirement of the storage space of the electronic device, and migrating target migration data to the target storage device, wherein the target migration data is a part or all of data that has been written into the electronic device.

17. The method according to claim 12, wherein the method performed further comprises:

if a computer connection signal is detected, sending a driver file of the virtual storage card to a computer, and instructing the computer to install the driver file, so that the computer displays storage information of the virtual storage card.

18. The method according to claim 12, wherein the method performed further comprises:

receiving a data read instruction, wherein the data read instruction carries a target virtual storage path corresponding to target read data;

determining a target physical storage path mapped by the target virtual storage path; and reading the target read data by using the target physical storage path.

19. The method according to claim 12, wherein the method performed further comprises:

receiving a data deletion instruction, wherein the data deletion instruction carries a target virtual storage path corresponding to target deletion data;

determining a target physical storage path mapped by the target virtual storage path; and deleting the target deletion data by using the target physical storage path.

20. The electronic device according to claim 12, wherein the selecting at least one of all the storage space as target storage space according to the preset rule further comprises:

selecting the internal space and/or the at least one external space as the target storage space when the target write data is separable data and the occupied space amount is greater than any one storage space.

* * * * *